(12) United States Patent
McLain et al.

(10) Patent No.: US 7,155,168 B2
(45) Date of Patent: Dec. 26, 2006

(54) METHOD AND APPARATUS USING VARIATIONS IN POWER MODULATION TO DETERMINE AN INTERFERING MOBILE TERMINAL

(75) Inventors: Christopher John McLain, Seattle, WA (US); Michael de La Chapelle, Bellevue, WA (US)

(73) Assignee: The Boeing Company, Chicago, IL (US)

(*) Notice: Subject to any disclaimer, the term of this patent is extended or adjusted under 35 U.S.C. 154(b) by 1116 days.

(21) Appl. No.: 10/022,981

(22) Filed: Dec. 17, 2001

(65) Prior Publication Data

US 2002/0151278 A1 Oct. 17, 2002

Related U.S. Application Data

(60) Provisional application No. 60/281,357, filed on Apr. 4, 2001.

(51) Int. Cl.
*H04B 17/00* (2006.01)

(52) U.S. Cl. ............... 455/67.11; 455/12.1; 455/13.4

(58) Field of Classification Search ............ 455/67.1, 455/13.3, 13.11, 430, 63.1, 431, 522, 12.1, 455/427; 342/368, 316, 352; 370/318
See application file for complete search history.

(56) References Cited

U.S. PATENT DOCUMENTS

| | | | |
|---|---|---|---|
| 5,463,656 A | 10/1995 | Polivka et al. | |
| 5,822,429 A | 10/1998 | Casabona et al. | |
| 5,842,125 A * | 11/1998 | Modzelesky et al. | 455/426.1 |
| 5,930,680 A | 7/1999 | Lusignan | |
| 6,075,969 A | 6/2000 | Lusignan | |
| 6,091,936 A | 7/2000 | Chennakeshu et al. | |
| 6,107,960 A | 8/2000 | Krasner | |
| 6,151,308 A | 11/2000 | Ibanez-Meier et al. | |
| 6,272,679 B1 | 8/2001 | Norin | |
| 6,330,462 B1 | 12/2001 | Chen | |

FOREIGN PATENT DOCUMENTS

| | | |
|---|---|---|
| EP | 1 052 790 A1 | 11/2000 |
| EP | 1 091 506 A2 | 4/2001 |

* cited by examiner

*Primary Examiner*—Melur Ramakrishnaiah
(74) *Attorney, Agent, or Firm*—Harness, Dickey & Pierce P.L.C.

(57) ABSTRACT

A method and apparatus for identifying which one of a plurality of mobile terminals in communication with a ground-based base station, via a transponded satellite, is causing interference with a non-target satellite orbiting in a vicinity of the transponded satellite. The method involves using the base station to sequentially check each of the mobile terminals to identify which one is causing the interference. The check is made by the base station commanding each mobile terminal to modulate the power level of its transmitted signals and then checking with an operator of the interfered with non-target satellite to see if the interference condition has changed. Once the mobile terminal causing the interference condition is identified, the base station can command the mobile terminal to reduce its transmit power accordingly.

12 Claims, 3 Drawing Sheets

METHOD AND APPARATUS USING VARIATIONS IN POWER MODULATION TO DETERMINE AN INTERFERING MOBILE TERMINAL

CROSS REFERENCE TO RELATED APPLICATIONS

This application claims priority from provisional application Ser. No. 60/281,357, filed Apr. 4, 2001.

FIELD OF THE INVENTION

The present invention relates to mobile RF terminals required to conduct bidirectional communications with a base station via a satellite link, and more particularly to a method and apparatus for identifying which one of a plurality of mobile terminals is causing interference with one or more satellites adjacent a target satellite.

BACKGROUND OF THE INVENTION

With mobile RF terminals located on mobile platforms such as aircraft, cruise ships and other moving platforms, communicating with a ground station via a transponded satellite, there is always the remote possibility, in spite of the safeguards that may be built into the mobile terminal, that the terminal may fail in an unanticipated manner. In such event, there is the possibility that the mobile terminal may cause interference with other satellites orbiting in the geo arc adjacent to the target satellite with which the mobile terminal is communicating.

It is also recognized that Fixed Services Satellite (FSS) operators may have difficulty in locating interference from VSAT (Very Small Aperture Terminal) systems that consist of thousands of unsophisticated terminals at remote sites.

Therefore, there exists a need for the ground station in communication with a plurality of mobile terminals via a transponded satellite to be able to quickly identify a malfunctioning mobile terminal which is causing interference with non-target satellites and to quickly resolve the interference incident.

SUMMARY OF THE INVENTION

The present invention is directed to a system and method for identifying an interfering mobile terminal from one of a plurality of mobile terminals by analyzing the modulated power level of the signals transmitted by the mobile terminals and determining when the modulated power level of a given mobile terminal varies from an expected modulation level. By detecting this variation, the interfering mobile terminal can be quickly identified and commanded to stop transmitting.

The present invention makes use of a base station, preferably a ground station, having a network operations center (NOC) for sending command signals to each mobile terminal. These command signals are relayed to the mobile terminals by a transponded satellite with which each mobile terminal is in communication with. The NOC commands each mobile terminal to vary the power of the signals being transmitted from a transmit antenna located on its associated mobile platform. The mobile terminals could be carried by aircraft, cruise ships or other moving vehicles, but for the purpose of this discussion reference will be made to the mobile platforms as aircraft.

The NOC first receives a message from a Fixed Services Satellite (FSS) operator that is experiencing interference from one of the mobile terminals, although the FSS operator will not be able to identify which mobile terminal is causing the interference. The NOC then begins commanding each aircraft, sequentially, to make data rate or transmit power changes (i.e., to modulate) to the signals being transmitted by a transmit antenna of its mobile terminal. The NOC analyzes the received signals and determines if the modulated signals meet the expected power levels, which would indicate that no interference will be caused. If the received signals meet the expected power levels, then the NOC determines that that particular mobile terminal is not the cause of the interference and commands the next mobile platform accessing the transponded satellite to begin transmitting signals in accordance with the commanded data rate modulation scheme. The NOC proceeds to perform the same analysis as described for the first aircraft, and repeats the entire process for each aircraft, one by one, until it determines which mobile terminal is causing the interference. During this process the NOC may also communicate with an operator of the non-target satellite experiencing interference. That operator could inform the NOC as a corresponding increase in the power level is detected at the interfered with satellite. In this manner the NOC can be apprised as soon as the interfering mobile terminal causes the increased level of power to be seen by an interfered with terminal.

The above-described method can be used to check a single mobile terminal for interference within a time span of about 5–10 seconds. A transponded satellite accommodating 20–30 aircraft can be checked typically in less than 5 minutes. Once the interfering mobile terminal is identified, it can be commanded by the NOC to shut down or to reduce its data transmission rate, thus effectively reducing the power level of its transmitted signals.

BRIEF DESCRIPTION OF THE DRAWINGS

The present invention will become more fully understood from the detailed description and the accompanying drawings, in which.

DETAILED DESCRIPTION OF THE PREFERRED EMBODIMENTS

Figure 1:
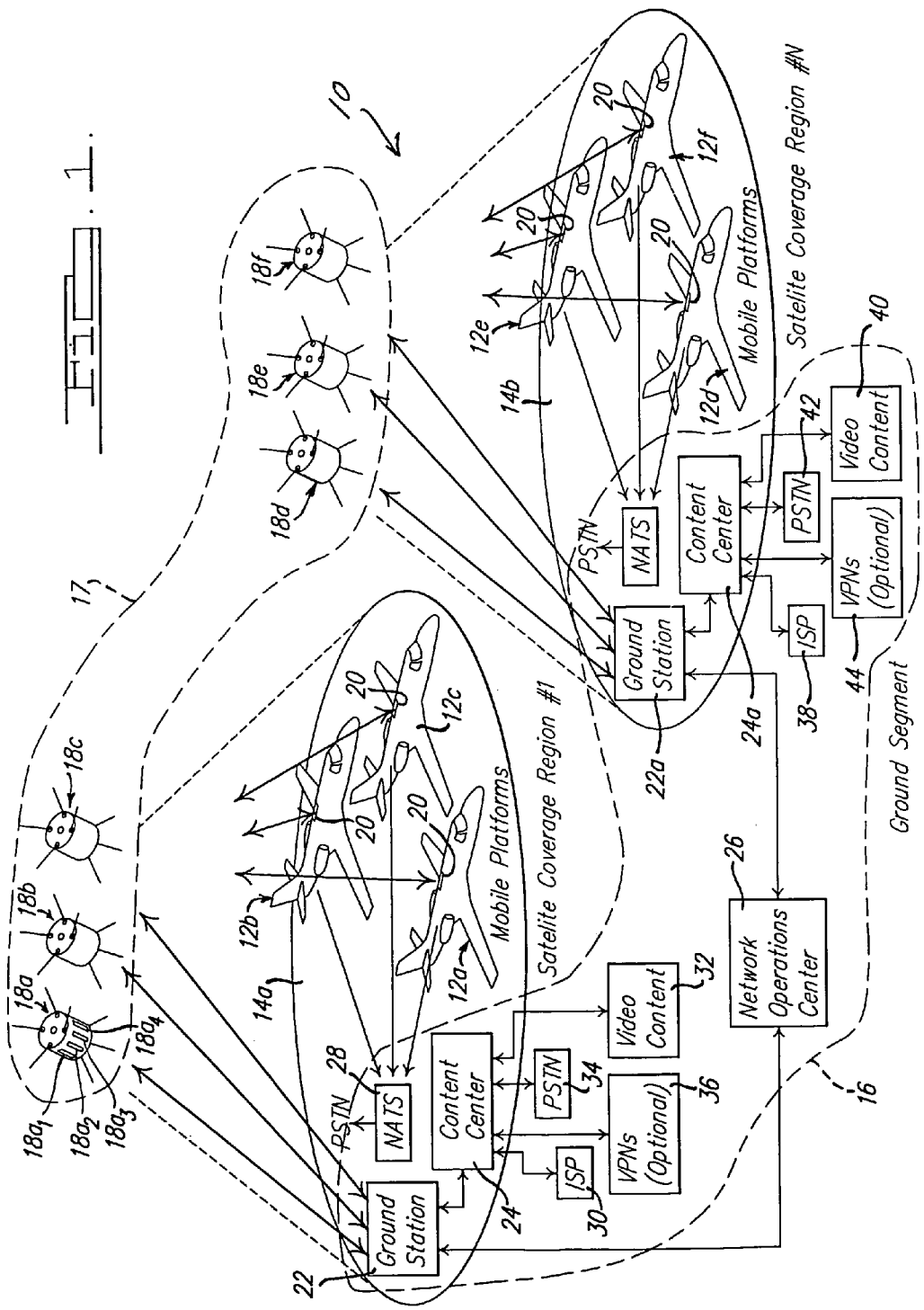
FIG. 1 is an exemplary system for enabling communications between a ground-based component and a plurality of mobile platforms.

Referring to FIG. 1, there is shown a system 10 for implementing the method of the present invention. The system 10 provides data content to and from a plurality of mobile platforms 12a–12f in one or more distinct coverage regions 14a and 14b. The system 10 generally comprises a ground segment 16, a plurality of satellites 18a–18f forming a space segment 17, and a mobile terminal 20 disposed on each mobile platform 12. The mobile platforms 12 could comprise aircraft, cruise ships or any other moving vehicle. Thus, the illustration of the mobile platforms 12 as aircraft in the figures herein, and the reference to the mobile platforms as aircraft throughout the following description should not be construed as limiting the applicability of the system 10 to only aircraft.

The space segment 17 may include any number of satellites 18 in each coverage region 14a and 14b needed to provide coverage for each region. Satellites 18a, 18b, 18d and 18e are preferably Ku or Ka-band satellites. Satellites 18c and 18f are Broadcast Satellite Services (BSS) satellites. Each of the satellites 18 are further located in a geostationary orbit (GSO) or a non-geostationary orbit (NGSO). Examples of possible NGSO orbits that could be used with this invention include low Earth orbit (LEO), medium Earth orbit (MEO) and highly elliptical orbit (HEO). Each of the satellites 18 includes at least one radio frequency (RF) transponder, and more preferably a plurality of RF transponders. For example satellite 18a is illustrated having four transponders $18a_1$–$18a_4$. It will be appreciated that each other satellite 18 illustrated could have a greater or lesser plurality of RF transponders as required to handle the anticipated number of aircraft 12 operating in the coverage area. The transponders provide "bent-pipe" communications between the aircraft 12 and the ground segment 16. The frequency bands used for these communication links could comprise any radio frequency band from approximately 10 MHz to 100 GHz. The transponders preferably comprise Ku-band transponders in the frequency band designated by the Federal Communications Commission (FCC) and the International Telecommunications Union (ITU) for fixed satellite services FSS or BSS satellites. Also, different types of transponders may be employed (i.e., each satellite 18 need not include a plurality of identical types of transponders) and each transponder may operate at a different frequency. Each of the transponders $18a_1$–$18a_4$ further include wide geographic coverage, high effective isotropic radiated power (EIRP) and high gain/noise temperature (G/T).

With further reference to FIG. 1, the ground segment 16 includes a ground station 22 in bidirectional communication with a content center 24 and a network operations center (NOC) 26. A second ground station 22a located in the second coverage area 14b may be used if more than one distinct coverage area is required for the service. In this instance, ground station 22a would also be in bidirectional communication with the NOC 26 via a terrestrial ground link or any other suitable means for establishing a communication link with the NOC 26. The ground station 22a would also be in bidirectional communication with a content center 24a. For the purpose of discussion, the system 10 will be described with respect to the operations occurring in coverage region 14a. However, it will be understood that identical operations relative to the satellites 18d–18f occur in coverage region 14b. It will also be understood that the system 10 may be scaled to any number of coverage regions 14 in the manner just described.

The ground station 22 comprises an antenna and associated antenna control electronics needed for transmitting data content to the satellites 18a and 18b. The antenna of the ground station 22 may also be used to receive data content transponded by the transponders $18a_1$–$18a_4$ originating from each mobile terminal 20 of each aircraft 12 within the coverage region 14a. The ground station 22 may be located anywhere within the coverage region 14a. Similarly, ground station 22a, if incorporated, can be located anywhere within the second coverage area 14b.

The content center 24 is in communication with a variety of external data content providers and controls the transmission of video and data information received by it to the ground station 22. Preferably, the content center 24 is in contact with an Internet service provider (ISP) 30, a video content source 32 and a public switched telephone network (PSTN) 34. Optionally, the content center 24 can also communicate with one or more virtual private networks (VPNs) 36. The ISP 30 provides Internet access to each of the occupants of each aircraft 12. The video content source 32 provides live television programming, for example, Cable News Network® (CNN) and ESPN®. The NOC 26 performs traditional network management, user authentication, accounting, customer service and billing tasks. The content center 24a associated with the ground station 22a in the second coverage region 14b would also preferably be in communication with an ISP 38, a video content provider 40, a PSTN 42, and optionally a VPN 44. An optional air telephone system 28 may also be included as an alternative to the satellite return link.

Figure 2:
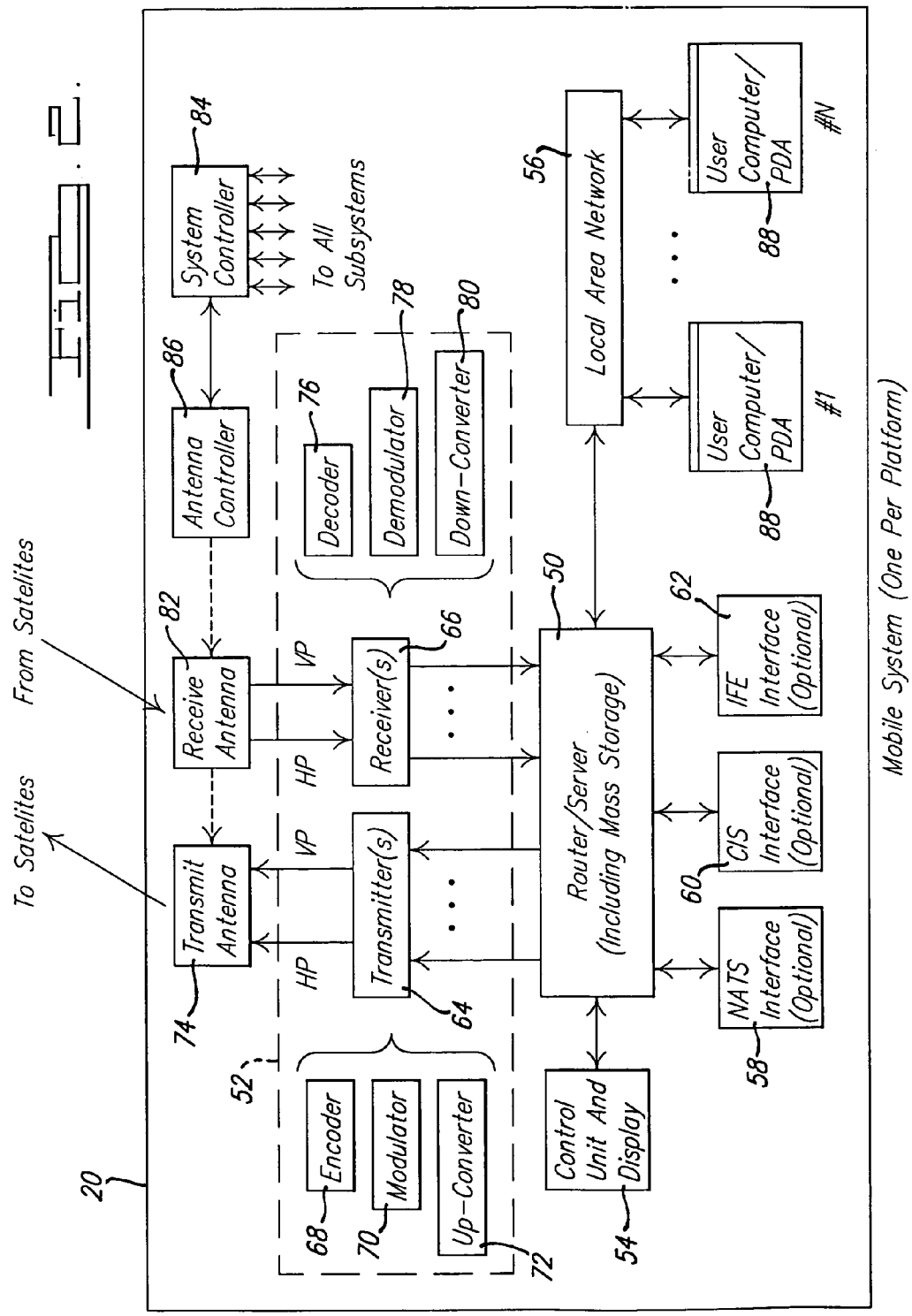
FIG. 2 is a simplified block diagram of a mobile terminal located on each mobile platform.

Referring now to FIG. 2, the mobile terminal 20 disposed on each aircraft 12 will be described in greater detail. Each mobile terminal 20 includes a data content management system in the form of a router/server 50 (hereinafter "server") which is in communication with a communications subsystem 52, a control unit and display system 54, and a distribution system in the form of a local area network (LAN) 56. Optionally, the server 50 can also be configured for operation in connection with a National Air Telephone System (NATS) 58, a crew information services system 60 and/or an in-flight entertainment system (IFE) 62.

The communications subsystem 52 includes a transmitter subsystem 64 and a receiver subsystem 66. The transmitter subsystem 64 includes an encoder 68, a modulator 70 and an Up-converter 72 for encoding, modulating and up-converting data content signals from the server 50 to a transmit antenna 74. The receiver subsystem 66 includes a decoder 76, a demodulator 78 and a down-converter 80 for decoding, demodulating and down-converting signals received by the receive antenna 82 into base band video and audio signals, as well as data signals. While only one receiver subsystem 66 is shown, it will be appreciated that preferably a plurality of receiver subsystems 66 will typically be included to enable simultaneous reception of RF signals from a plurality of RF transponders. If a plurality of receiver subsystems 66 are shown, then a corresponding plurality of components 76–80 will also be required.

The signals received by the receiver subsystem 66 are then input to the server 50. A system controller 84 is used to control all subsystems of the mobile system 20. The system controller 84, in particular, provides signals to an antenna controller 86 which is used to electronically steer the receive antenna 82 to maintain the receive antenna pointed at a particular one of the satellites 18, which will hereinafter be referred to as the "target" satellite. The transmit antenna 74 is slaved to the receive antenna 82 such that it also tracks the target satellite 18. It will be appreciated that some types of mobile antennas may transmit and receive from the same aperture. In this case the transmit antenna 74 and the receive antenna 82 are combined into a single antenna.

With further reference to FIG. 2, the local area network (LAN) 56 is used to interface the server 50 to a plurality of access stations 88 associated with each seat location on board the aircraft 12a. Each access station 88 can be used to interface the server 50 directly with a user's laptop computer, personal digital assistant (PDA) or other personal computing device of the user. The access stations 88 could also each comprise a seat back mounted computer/display. The LAN 56 enables bidirectional communication of data between the user's computing device and the server 50 such that each user is able to request a desired channel of television programming, access a desired website, access his/her email, or perform a wide variety of other tasks independently of the other users on board the aircraft 12.

The receive and transmit antennas 82 and 74, respectively, may comprise any form of steerable antenna. In one preferred form, these antennas comprise electronically scanned, phased array antennas. Phased array antennas are especially well suited for aviation applications where aerodynamic drag is important considerations. One particular form of electronically scanned, phased array antenna suitable for use with the present invention is disclosed in U.S. Pat. No. 5,886,671, assigned to The Boeing Co.

Referring further to FIG. 1, in operation of the system 10, the data content is preferably formatted into Internet protocol (IP) packets before being transmitted by either the ground station 22, or from the transmit antenna 74 of each mobile terminal 20. For the purpose of discussion, a transmission of data content in the form of IP packets from the ground station 22 will be referred to as a "forward link" transmission. IP packet multiplexing is also preferably employed such that data content can be provided simultaneously to each of the aircraft 12 operating within the coverage region 14*a* using unicast, multicast and broadcast transmissions.

The IP data content packets received by each of the transponders $18a_1$–$18a_4$ are then transponded by the transponders to each aircraft 12 operating within the coverage region 14*a*. While multiple satellites 18 are illustrated over coverage region 14*a*, it will be appreciated that at the present time, a single satellite is capable of providing coverage to an area encompassing the entire continental United States. Thus, depending upon the geographic size of the coverage region and the mobile platform traffic anticipated within the region, it is possible that only a single satellite incorporating a single transponder may be needed to provide coverage for the entire region. Other distinct coverage regions besides the continental United States include Europe, South/Central America, East Asia, Middle East, North Atlantic, etc. It is anticipated that in service regions larger than the continental United States, that a plurality of satellites 18 each incorporating one or more transponders may be required to provide complete coverage of the region.

The receive antenna 82 and transmit antenna 74 are each preferably disposed on the top of the fuselage of their associated aircraft 12. The receive antenna 74 of each aircraft receives the entire RF transmission of encoded RF signals representing the IP data content packets from at least one of the transponders $18a_1$–$18a_4$. The receive antenna 82 receives horizontally polarized (HP) and vertically polarized (VP) signals which are input to at least one of the receivers 66. If more than one receiver 66 is incorporated, then one will be designated for use with a particular transponder $18a_1$–$18a_4$ carried by the target satellite 18 to which it is pointed. The receiver 66 decodes, demodulates and downconverts the encoded RF signals to produce video and audio signals, as well as data signals, that are input to the server 50. The server 50 operates to filter off and discard any data content not intended for users on the aircraft 12 and then forwards the remaining data content via the LAN 56 to the appropriate access stations 88. In this manner, each user receives only that portion of the programming or other information previously requested by the user. Accordingly, each user is free to request and receive desired channels of programming, access email, access the Internet and perform other data transfer operations independently of all other users on the aircraft 12*a*.

Referring further to FIG. 1, a transmission of data content from the aircraft 12*a* to the ground station 22 will be described. This transmission is termed a "return link" transmission. The antenna controller 86 causes the transmit antenna 74 to maintain the antenna beam thereof pointed at the target satellite 18*a*. The channels used for communication from each mobile terminal 20 back to the ground station 22 represent point-to-point links that are individually assigned and dynamically managed by the NOC 26 of the ground segment 16. For the system 10 to accommodate several hundred or more aircraft 12, multiple aircraft will need to be assigned to each transponder carried by a given satellite 18. The preferred multiple access methods for the return link are code division multiple access (CDMA), frequency divisional multiple access (FDMA), time division multiple access (TDMA) or combinations thereof. Thus, multiple mobile terminals 20 may be assigned to a single transponder $18a_1$–$18a_4$. Where a greater number of aircraft 12 incorporating a mobile terminal 20 are operated within the coverage region 14*a*, then the number of transponders required increases accordingly.

The receive antenna 82 may implement a closed-loop tracking system for pointing the antenna beam and for adjusting the polarization of the antennas based on receive signal amplitude. The transmit antenna 74 is slaved to the point direction and polarization of the receive antenna 82. An alternative implementation could use an open-loop tracking method with the pointing direction and polarization determined by knowledge of the aircraft's 12 position and attitude using an on-board inertial reference unit (IRU) and knowledge of the location of the satellites 18.

Encoded RF signals are transmitted from the transmit antenna 74 of the mobile terminal 20 of a given aircraft 12 to an assigned one of the transponders $18a_1$–$18a_4$, and transponded by the designated transponder to the ground station 22. The ground station 22 communicates with the content center 24 to determine and provide the appropriate data being requested by the user (e.g., content from the world wide web, email or information from the user's VPN).

An additional concern that must be taken into account with the system 10 is the potential for interference that may result from the small aperture size of the receive antenna 82. The aperture size of the receive antenna 82 is typically smaller than conventional "very small aperture terminal" (VSAT) antennas. Accordingly, the beam from the receive antenna 82 may encompass adjacent satellites along the geosynchronous arc. This can result in interference from satellites other than the target satellite being received by a particular mobile terminal 20. To overcome this potential problem, the system 10 preferably uses a lower than normal forward link data rate that overcomes the interference from adjacent satellites. For example, the system 10 operates at a preferred forward link data rate of at least about 5 Mbps per transponder, using a typical FSS Ku-band transponder (e.g., Telstar-6) and an antenna having an active aperture of about 17 inches by 24 inches (43.18 cm by 60.96 cm). For comparison purposes, a typical Ku-band transponder usually operates at a data rate of approximately 30 Mbps using conventional VSAT antennas.

Using a standard digital video broadcast (DVB) waveform, the forward link signal typically occupies less than 8 MHz out of a total transponder width of 27 MHz. However, concentrating the transponder power in less than the full transponder bandwidth could create a regulatory concern. FCC regulations presently regulate the maximum effective isotropic radiated power (EIRP) spectral density from a transponder to prevent interference between closely spaced satellites. Accordingly, in one preferred embodiment of the system, spread spectrum modulation techniques are employed in modulator 70 to "spread" the forward link signal over the transponder bandwidth using well known signal spreading techniques. This reduces the spectral density of the transponded signal, thus eliminating the possibility of interference between two or more mobile terminals 20.

It is also equally important that the transmit antenna 74 meets regulatory requirements that prevent interference to satellites adjacent to the target satellite 18. The transmit antennas used in most mobile applications also tend to be smaller than conventional VSAT antennas (typically reflector antennas that are 1 meter in diameter). Mobile transmit antennas used for aeronautical applications should have low aerodynamic drag, be lightweight, have low power consumption and be of relatively small size. For all these reasons, the antenna aperture of the transmit antenna 74 is preferably smaller than a conventional VSAT antenna. VSAT antennas are sized to create an antenna beam that is narrow enough to illuminate a single FSS satellite along the geosynchronous arc. This is important because FSS satellites are spaced at 2° intervals along the geosynchronous arc. The smaller than normal antenna aperture of the transmit antenna 74 used with the present invention, in some instances, may create an antenna beam that is wide enough to irradiate satellites that are adjacent to the target satellite along the geosynchronous arc, which could create an interference problem. The chance of this potential problem arising is greatly reduced by employing spread spectrum modulation techniques on the return link transmissions as well. The transmitted signal from the transmit antenna 74 is spread in frequency to produce an interfering signal at the adjacent satellite that is below the threshold EIRP spectral density at which the signal would interfere. It will be appreciated, however, that spread spectrum modulation techniques may not be required if the angular spacing between satellites within a given coverage region is such that interference will not be a problem.

The present invention relates to a system and method for quickly detecting which one of a plurality of mobile RF terminals 20 is causing interference with an FSS satellite 18 orbiting in the vicinity of a transponded target satellite, such as satellite 18a, with which the mobile terminals 20 are communicating.

Figure 3:
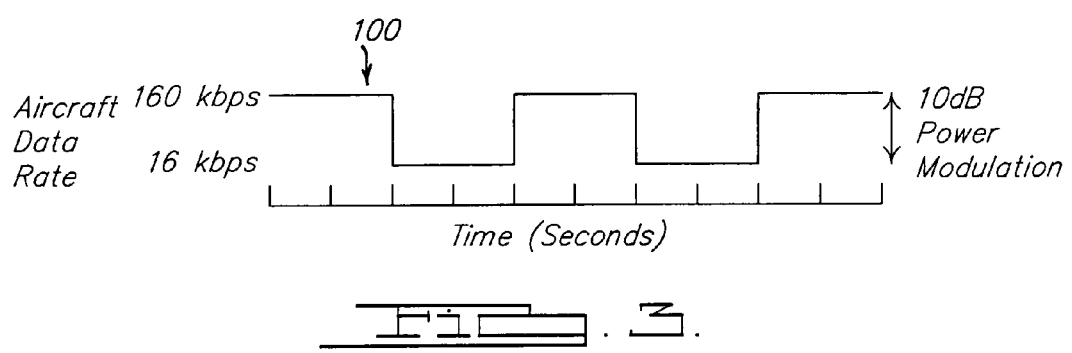
FIG. 3 is a graph showing the signals transmitted from a mobile platform modulated in accordance with an exemplary modulation scheme commanded by a ground-based component, from which the ground-based component is able to determine if the signals are causing interference with an FSS satellite adjacent a target satellite with which the mobile platform is communicating.

Referring to FIG. 3, a graph 100 of a modulated signal transmitted from a first one of the mobile terminals 20 is shown. The NOC 26 initiates the method of the present invention by commanding the first mobile terminal 20 to transmit signals at a changing data rate (i.e., power level). In this example, the data rate changes from 160 kbps to 16 kbps, and the duty cycle of the signal is 50%.

The NOC 26 then checks with the operator of the interfered with FSS satellite to determine if the interfering condition is being modulated in the same manner (i.e., has increased and/or decreased) as the modulated signal transmitted from the first of the mobile terminals 20. If the interfering condition is not affected, then the NOC 26 determines that the first mobile terminal 20 is not causing the interference. The NOC 26 then commands a second one of the mobile terminals 20 accessing the target satellite 18a to transmit signals in accordance with the modulation profile of the signal level shown in graph 100. If the NOC 26 determines that this mobile terminal 20 is also not interfering, it will continue to test each mobile terminal 20, in sequential fashion, until it determines which mobile terminal is causing the interference with the satellite. Once it determines which mobile terminal 20 is causing the interference, it either commands that mobile terminal 20 to reduce its transmit power level to a suitable level that will not cause interference, or to stop transmitting entirely.

The NOC 26 may also monitor the target satellite 18a and/or the interfered with FSS satellite. If the NOC 26 can detect the interfering signal, the NOC can directly determine whether the interfering signal is affected by the power modulation. In this manner, the NOC 26 can determine which mobile terminal 20 is causing the interference without continuous communication with the operator of the interfered with FSS satellite.

Using the above-described process, the mobile terminal 20 of each aircraft 12 can be checked by the NOC 26 within a time span of about 5–10 seconds. An entire transponded satellite accommodating up to about 30 aircraft can be checked in less than about 5 minutes.

Those skilled in the art can now appreciate from the foregoing description that the broad teachings of the present invention can be implemented in a variety of forms. It will also be appreciated that the variations of the preferred embodiments in specific embodiments herein could readily be implemented in other ones of the embodiments. Therefore, while this invention has been described in connection with particular examples thereof, the true scope of the invention should not be so limited since other modifications will become apparent to the skilled practitioner upon a study of the drawings, specification and following claims.

What is claimed is:

1. A method for detecting which one of a plurality of mobile RE terminals located on a corresponding plurality of mobile platforms, and communicating with a transponded target satellite, is causing interference with a non-target satellite orbiting in a vicinity of said target satellite, the method comprising:
   a) using a base station component to receive a message indicating that interference with said non-target satellite is occurring;
   b) using the base station component to command a first one of a plurality of mobile terminals in communication with said base station component to modulate its transmit signal between one of a plurality of data rates or power values assigned by the base station component;
   c) using said base station component to check with an operator of said non-target satellite to determine if a change in a degree of interference was detected by said operator; and
   d) if a degree of change is detected by said operator, then determining that said first one of said mobile terminals is causing said interference.

2. The method of claim 1, further comprising the step: if steps b) and c) reveal that said first one of said mobile terminals is not the cause of said interference, then using said base station component to repeat steps b) and c) to sequentially check each said mobile terminal accessing said target satellite until it is determined which one of said mobile terminals is causing said interference.

3. The method of claim 1, wherein step a) comprises using a ground-based, base station component.

4. The method of claim 1, wherein said data rates comprise a plurality of different data transmission rates between about 16 kbps to about 160 kbps.

5. A method for detecting which one of a plurality of mobile RF terminals located on a corresponding plurality of mobile platforms, and communicating with a transponded target satellite, is causing interference with a non-target satellite orbiting in a vicinity of said target satellite, the method comprising the steps of:
   a) using a base station to receive a message indicating that interference with said non-target satellite is occurring;
   b) using the base station to command a first one of a plurality of mobile terminals in communication with said base station to modulate its transmit signal between data rates assigned by the base station, to thereby modify the power level of said modulated transmit signal;
   c) checking with an operator of said non-target satellite to determine if a change in a degree of interference, relative to said non-target satellite, was detected by said operator when said first one of said mobile terminals changed its date rate; and
   d) if no change in said degree of interference is detected, then performing steps b) and c) repeatedly to test each of said mobile terminals until it is determined which one of said mobile terminals produces a change in interference detected by said operator of said non-target satellite.

6. The method of claim 5, further comprising the step of using said base station to communicate a command to said first one of said mobile terminals to reduce its transmit power level.

7. The method of claim 5, wherein step b) comprises commanding said first one of said mobile terminal to modulate its said transmit signal between data rates within a range of about 16 kbps and 160 kbps.

8. The method of claim 5, wherein each said mobile terminal is determined to not be causing said interference before checking a different one of said plurality of mobile terminals.

9. The method of claim 5, wherein step a) comprises using a ground-based base station.

10. A method for detecting which one of a plurality of mobile RF terminals located on a corresponding plurality of mobile platforms, and communicating with a transponded target satellite, is causing interference with a non-target satellite orbiting in the vicinity of said target satellite, the method comprising the steps of:
   a) using a ground station having a network operations center (NOC) to receive a message from an operator of said non-target satellite indicating that interference with said non-target satellite is occurring;
   b) using the NOC to command a first one of a plurality of mobile terminals to modulate its transmit signal between data rates assigned by the NOC;
   c) using said NOC to check with said operator to determine if said interference condition has changed;
   d) if said interference condition has changed, then determining that said first one of said mobile terminals is causing said interference condition; and
   e) if said interference has not changed, then repeating steps b) and c) for a subsequent one of said mobile terminals until that said mobile terminal is identified that causes a change in said interference condition.

11. The method of claim 10, wherein step b) comprises using said NOC to command each said mobile terminal to modulate its said transmit signal between a data rate of about 16 kbps and about 160 kpbs.

12. The method of claim 10, wherein one of said plurality of mobile terminals is checked by said NOC and verified not to be causing said interference before checking a different one of said plurality of mobile terminals.

* * * * *